US007689333B2

(12) United States Patent
Bauerle et al.

(10) Patent No.: US 7,689,333 B2
(45) Date of Patent: Mar. 30, 2010

(54) DIAGNOSTIC FAULT CLEARING SYSTEM

(75) Inventors: Paul A. Bauerle, Fenton, MI (US); Ronald W. Van Diepen, Ann Arbor, MI (US); Joseph M. Stempnik, Warren, MI (US); Kevin M. Baltes, Wixom, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 684 days.

(21) Appl. No.: 11/219,042

(22) Filed: Sep. 2, 2005

(65) Prior Publication Data

US 2007/0055421 A1 Mar. 8, 2007

(51) Int. Cl.
*G06F 19/00* (2006.01)

(52) U.S. Cl. ........................................ 701/29; 340/438

(58) Field of Classification Search .................. 701/29, 701/33–34, 36; 702/182–183; 714/100, 714/25; 340/438

See application file for complete search history.

(56) References Cited

U.S. PATENT DOCUMENTS

| | | | | |
|---|---|---|---|---|
| 4,277,772 | A * | 7/1981 | Kastura et al. | 340/459 |
| 5,671,141 | A * | 9/1997 | Smith et al. | 701/29 |
| 5,928,303 | A * | 7/1999 | Sakai | 701/109 |
| 6,112,148 | A * | 8/2000 | Baraban et al. | 701/107 |
| 7,239,946 | B2 * | 7/2007 | Sowa | 701/29 |

* cited by examiner

*Primary Examiner*—Yonel Beaulieu

(57) ABSTRACT

A vehicle diagnostics clearing system that detects a clear diagnostic faults flag and clears diagnostic faults from a control module includes a clear diagnostic faults flag monitoring module and a clear diagnostic faults module. The clear diagnostic faults flag monitoring module periodically monitors the clear diagnostic faults flag in the control module. When the clear diagnostic faults flag monitoring module detects that the clear diagnostic faults flag is set, the clear diagnostic faults module clears the diagnostic faults from the control module for a predetermined period.

14 Claims, 3 Drawing Sheets

DIAGNOSTIC FAULT CLEARING SYSTEM

FIELD OF THE INVENTION

The present invention relates to vehicle control modules, and more particularly to clearing diagnostic faults generated by vehicle control module.

BACKGROUND OF THE INVENTION

Automobiles have multiple control modules that monitor the operation of a vehicle. One function of a control module is to report diagnostic faults. These diagnostic faults are reported to a driver though an indicator light that is typically located on an instrument cluster. When the indicator light is enabled, the driver is notified that the vehicle has experienced a problem and should be serviced soon. Once the vehicle has been serviced, a technician resets the diagnostic faults using a service tool.

Resetting the diagnostic faults with a service tool is the preferred method to clear a fault. However, the diagnostic faults can be reset without a service tool if the code suffers a single point ROM or RAM failure. In the event of a ROM or RAM failure, there is a possibility that the clear diagnostic faults flag may become stuck in one state. This may cause the clear diagnostic faults algorithm to continuously clear all diagnostic faults. This “sleeping fault” is undesirable because the driver would not be notified that diagnostic faults currently exist and no remedial action would be taken. In other words, the operator will not be notified that the vehicle may have a significant problem requiring service and may cause further damage that would otherwise be avoided.

SUMMARY OF THE INVENTION

A vehicle diagnostics clearing system that detects a clear diagnostic faults flag and clears diagnostic faults from a control module according to the present invention includes a clear diagnostic faults flag monitoring module and a clear diagnostic faults module. The clear diagnostic faults flag monitoring module periodically monitors the clear diagnostic faults flag in the control module. When the clear diagnostic faults flag monitoring module detects that the clear diagnostic faults flag is set, the clear diagnostic faults module clears the diagnostic faults from the control module for a predetermined period.

In other features, the vehicle diagnostics clearing system includes a timer and a comparing module. The timer increments when the clear diagnostic faults flag monitoring module determines that the clear diagnostic faults flag is set in the control module. The comparing module determines if the timer is less that the predetermined period. When the timer is less than the predetermined period, the clear diagnostic faults module clears the diagnostic faults from the control module.

In still other features, the vehicle diagnostics clearing system clears diagnostic faults from the control module when the timer is less than the predetermined period.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
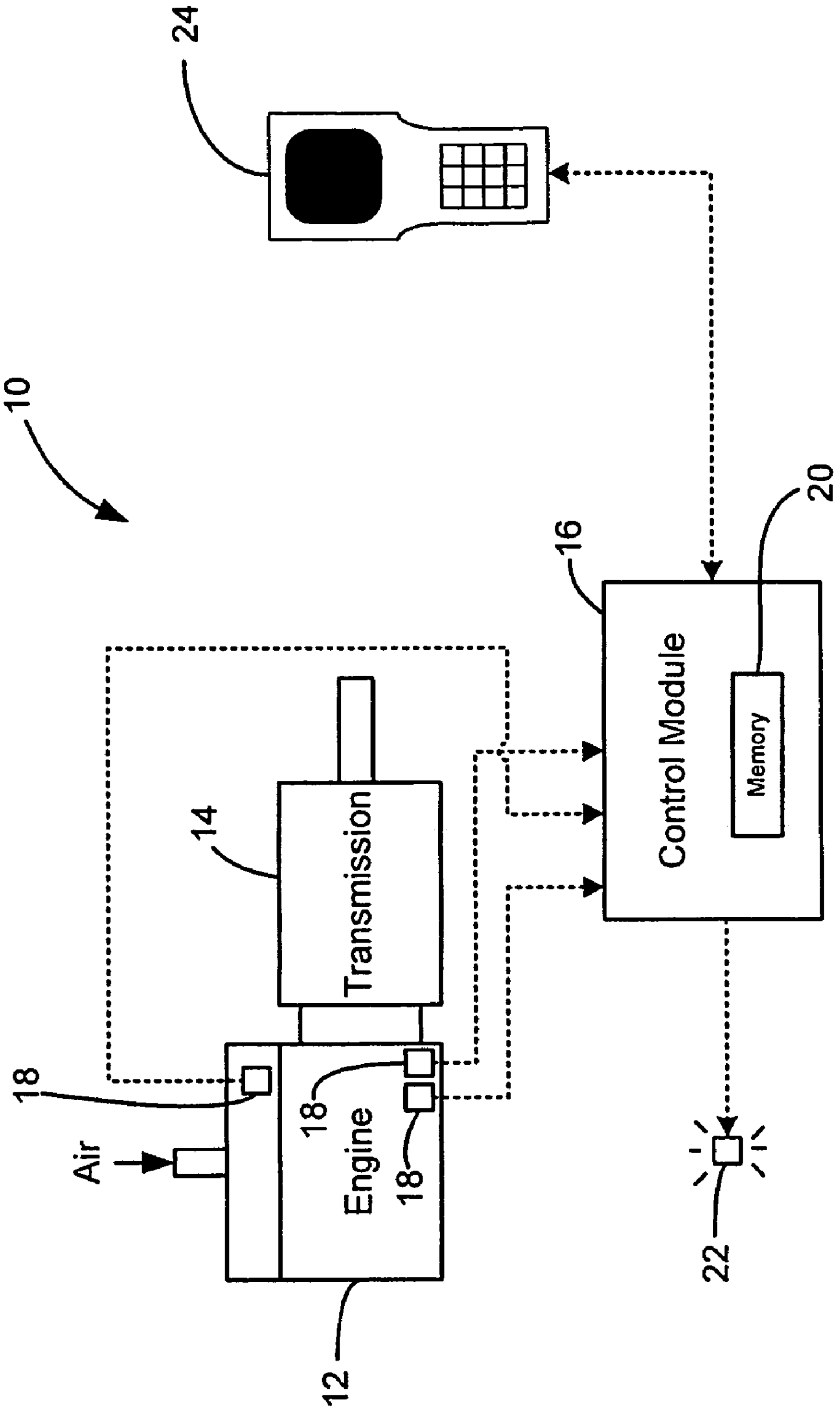
FIG. 1 illustrates an exemplary vehicle including a control module that communicates with vehicle sensors and reports diagnostic faults.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring to FIG. 1, an exemplary vehicle 10 includes an engine 12, a transmission 14, and a control module 16. The control module 16 monitors the operation of the vehicle 10 using various sensors 18. The control module 16 includes memory 20 that stores diagnostic fault codes. When a diagnostic fault is detected, the control module 16 notifies the driver that the vehicle should be serviced by illuminating an indicator light 22. Once the vehicle has been serviced, a service technician resets diagnostic faults stored in memory 20 using a service tool 24.

Figure 2:
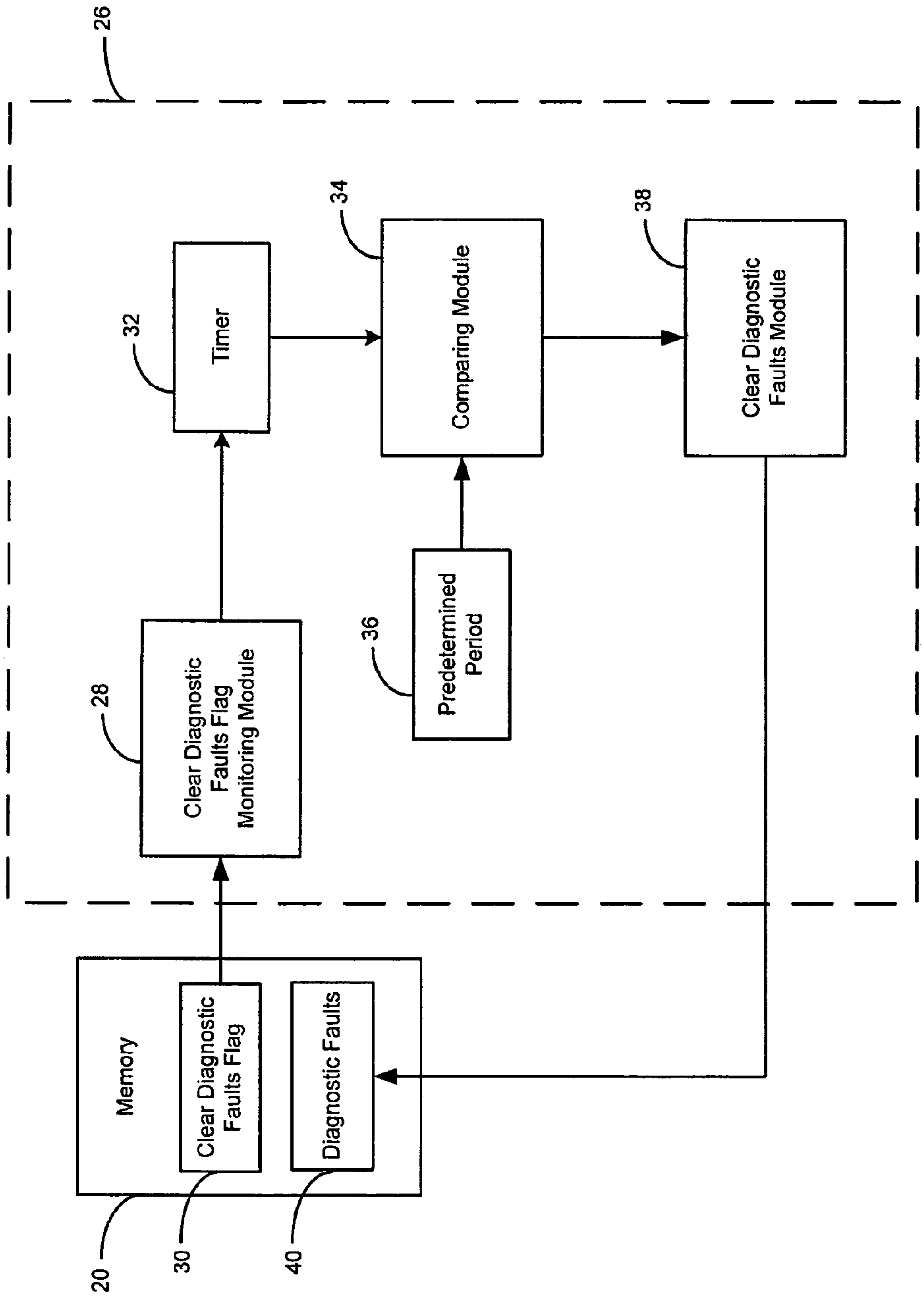
FIG. 2 is a functional block diagram of a vehicle diagnostics clearing system according to the present invention.

Referring now to FIG. 2, a diagnostics clearing system 26 includes a clear diagnostic faults flag monitoring module 28 that periodically monitors a clear diagnostic faults flag 30 stored in memory 20 associated with the control module 16.

When the clear diagnostic faults flag 30 is detected, a timer 32 begins to increment. A comparing module 34 compares the value of the timer 32 to a predetermined period 36. If the value of the timer 32 is less than the value of the predetermined period 36, then a clear diagnostic faults module 38 clears the diagnostic faults 40 stored in the memory 20.

Figure 3:
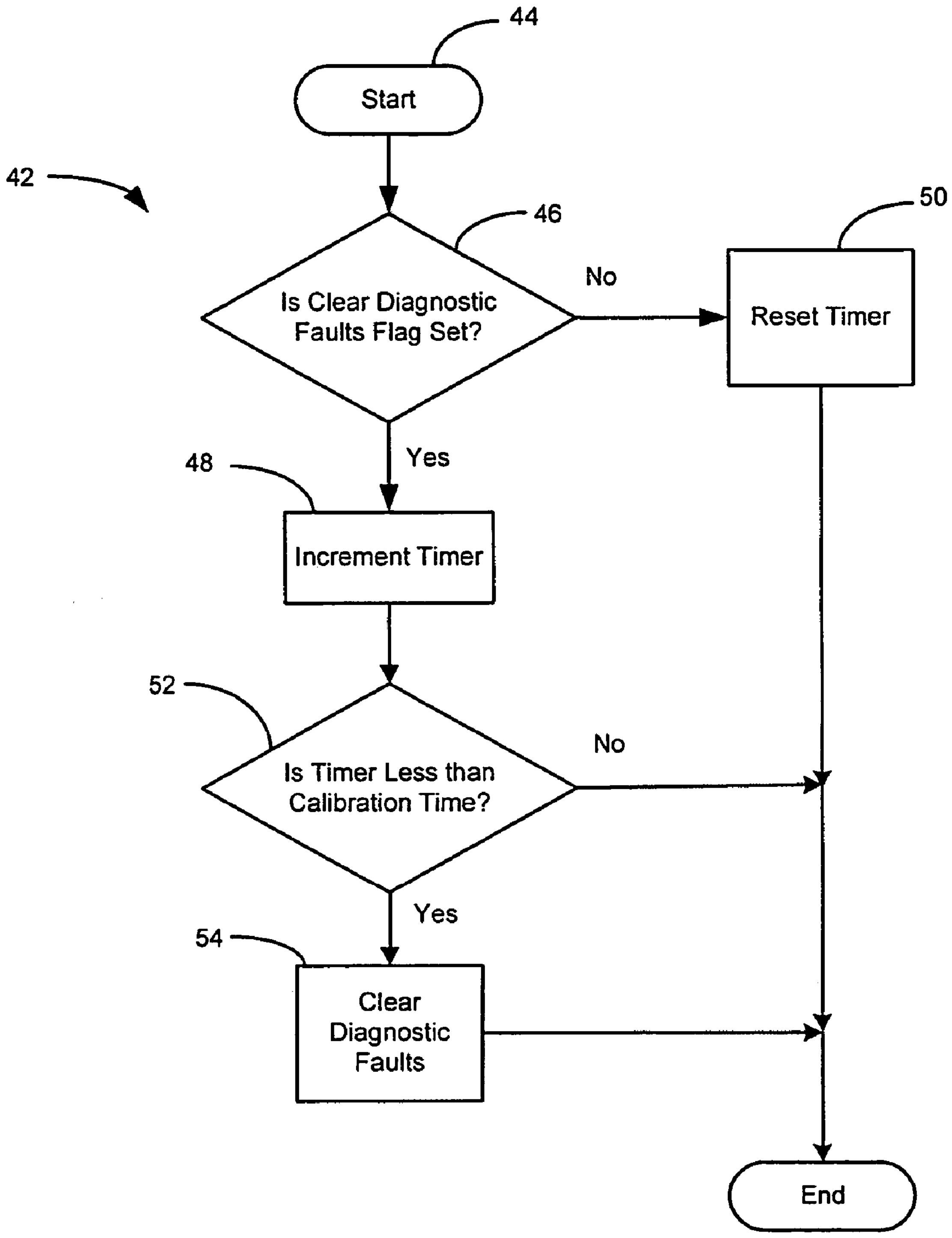
FIG. 3 is a flowchart illustrating steps of a vehicle diagnostics clearing method.

Referring now to FIG. 3, the diagnostics clearing system 26 implements a method generally identified at 42 to clear the diagnostic faults 40 from the memory 20. The method 42 performed by the diagnostics clearing system 26 begins with step 44. In step 46, the clear diagnostic faults flag monitoring module 28 determines whether the clear diagnostic faults flag 30 has been set in the memory 20. If the clear diagnostic faults flag 30 has not been set in the memory 20, then timer 32 is reset in step 50 and the process ends. If the clear diagnostic faults flag 30 has been set in the memory 20 as determined in step 46, then the timer 32 is incremented in step 48. In step 52, the comparing module 34 determines whether the value of the timer 32 is less than the predetermined period 36. If step 52 is true, then step 54 uses the clear diagnostic faults module 38 to clear the diagnostic faults 40 from the memory 20 and the process ends. If step 52 is false, the process ends.

The vehicle diagnostics clearing algorithm of the present invention is a significant enhancement to the existing method for clearing vehicle diagnostic faults. The algorithm prevents vehicle diagnostics from being inadvertently reset by a single point failure within the control module. The vehicle diagnostics clearing algorithm is easily implemented since it only requires software changes to existing systems.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A vehicle diagnostics clearing system, comprising:

a clear diagnostic faults flag monitoring module that periodically monitors a clear diagnostic faults flag in a control module; and a clear diagnostic faults module that automatically clears diagnostic faults from the control module for a predetermined period after the clear diagnostic faults flag is set in the control module.

2. The vehicle diagnostics clearing system of claim 1 further comprising:

a timer that increments when said clear diagnostic faults flag monitoring module determines that the clear diagnostic faults flag has been set in the control module; and a comparing module that determines if said timer is less than said predetermined period.

3. The vehicle diagnostics clearing system of claim 2 wherein said clear diagnostics faults module clears the diagnostic faults from the control module when said timer is less than said predetermined period.

4. A vehicle diagnostics clearing method, comprising:

periodically determining if a clear diagnostics faults flag has been set; and automatically clearing diagnostic faults for a predetermined period after the clear diagnostic faults flag has been set.

5. The vehicle diagnostics clearing method of claim 4 further comprising:

incrementing a timer when the clear diagnostic faults flag has been set; and determining if said timer is less than said predetermined period.

6. The vehicle diagnostics clearing method of claim 5 wherein the diagnostic faults are cleared when said timer is less than said predetermined period.

7. The vehicle diagnostic clearing system of claim 2 wherein said timer is reset when the clear diagnostic faults flag is not set.

8. The vehicle diagnostic clearing system of claim 2 wherein said clear diagnostic faults module clears the diagnostic faults until said timer is greater than or equal to said predetermined period.

9. The vehicle diagnostic clearing method of claim 6 further comprising resetting said timer when the clear diagnostic faults flag is not set.

10. The vehicle diagnostic clearing method of claim 6 further comprising clearing the diagnostic faults from the control module until the timer is greater than or equal to said predetermined period.

11. A method comprising:

determining if a clear faults flag is set in an engine control module of a vehicle;

repeatedly clearing diagnostic faults of the engine control module for a predetermined period after the clear faults flag has been set; and stopping the clearing diagnostic faults after the predetermined period has elapsed.

12. The method of claim 11 further comprising periodically incrementing a timer while the clear faults flag is set.

13. The method of claim 12 further comprising clearing the diagnostic faults when both the clear faults flag is set and the timer is less than the predetermined period.

14. The method of claim 13 further comprising resetting the timer when the clear faults flag is not set.

* * * * *